No. 608,572. Patented Aug. 9, 1898.
G. J. BUNGAY.
BICYCLE HANDLE BAR.
(Application filed Mar. 20, 1897.)
(No Model.)
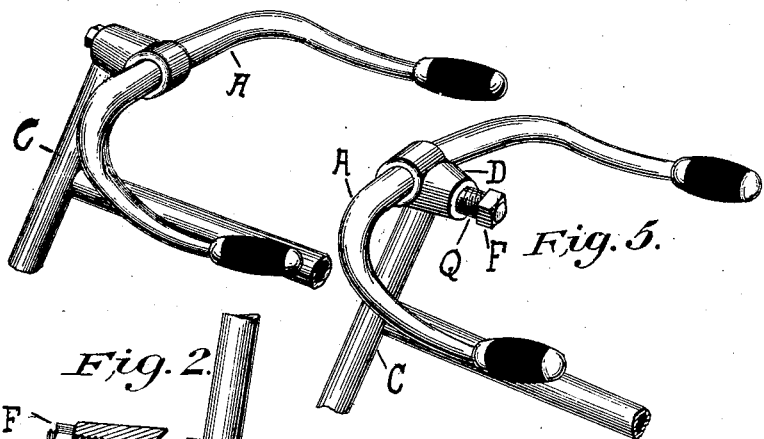
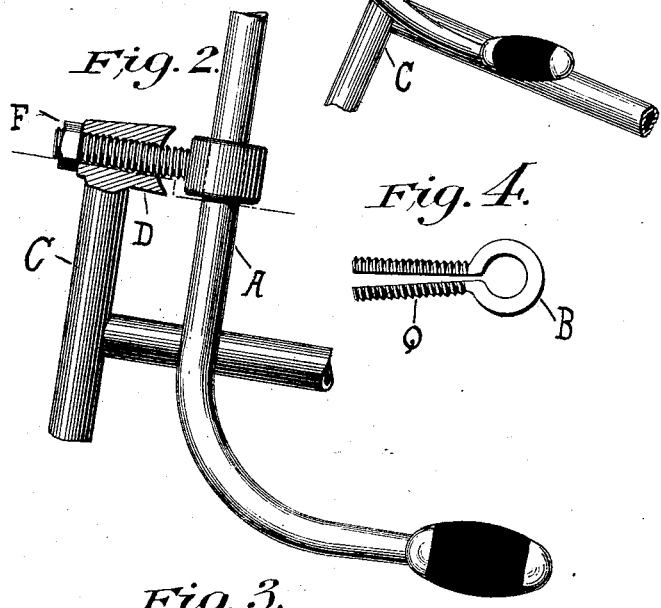
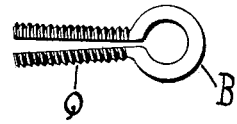
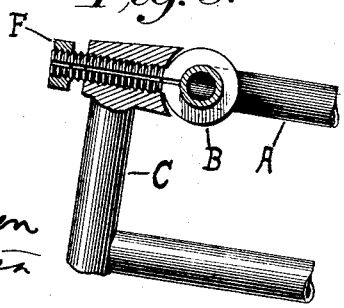
Witnesses.
Charles H. Bruen
A. V. R. Van Houten
Inventor.
George J. Bungay
By John F. Kerr
Attorney
THE NORRIS PETERS CO., PHOTO-LITHO., WASHINGTON, D. C.

UNITED STATES PATENT OFFICE.

GEORGE JAMES BUNGAY, OF PATERSON, NEW JERSEY.

BICYCLE HANDLE-BAR.

SPECIFICATION forming part of Letters Patent No. 608,572, dated August 9, 1898.

Application filed March 20, 1897. Serial No. 628,400. (No model.)

*To all whom it may concern:*

Be it known that I, GEORGE JAMES BUNGAY, of the city of Paterson, in the county of Passaic and State of New Jersey, have invented certain new and useful Improvements in Tilting Handle-Bars for Bicycles, of which the following is a specification.

The object of my invention is to provide a handle-bar for bicycles that may be easily and quickly tilted or turned, so that the bar will assume a perpendicular position when not in use.

Bicycles take up considerable room when put away on account of the handles projecting so far sidewise beyond the wheels, or when the handle-bar is turned so that it will not project the front wheel will be turned and prove an obstacle in the way of persons passing it. On that account much inconvenience is experienced, especially in putting the wheels in a baggage-car on a train. I wish to obviate all this by providing a handle-bar that may be turned without turning the front wheel, so as to permit many more wheels to be put in a car than at present the way handle-bars are secured. Either the front wheels or the handles project now so that they require a great deal of room.

When my handle-bar is turned or tilted, it will be parallel with the post, to which the handle-bar is secured, or nearly so. The handles will not be in the way, and the bicycle will not take up much room. The top bar of the diamond frame in a gentleman's wheel may not permit the handle-bar to be turned until it is perpendicular or at least parallel with the post to which it is secured; but in a lady's bicycle it may be made to assume that position.

The invention consists of the novel construction and arrangement of various parts shown in the accompanying drawings, which form a part of this specification.

In the drawings similar letters of reference indicate like parts.

Figure 1 is a view showing my handle-bar secured to the front post of the bicycle-frame in position for riding, the securing-nut being on the outside of the post. Fig. 2 shows the handle-bar in a perpendicular position, the nut being loosened to permit the handle-bar to be turned. Fig. 3 is a sectional view of the top of post, showing the novel construction, consisting of the bar-clamp, having the ends which come together provided with a screw-thread and passing through the head of the post, and the nut securing the same on the outside of the post and the handle-bar in the clamp. Fig. 4 is a view of my screw-clamp for handle-bar; and Fig. 5 is a view similar to that shown in Fig. 1, the screw-clamp being passed from front to rear of post and secured in the rear thereof by the nut.

Either Fig. 1 or Fig. 5, however, is the embodiment of the essential elements of my invention and either may be employed without departing from the spirit thereof. I prefer to secure the clamp as shown in Fig. 5, as it will be more convenient for the rider to manipulate the nut when he desires to change the position of the handle-bar.

My invention as shown consists of the locking device to hold the handle-bar at right angles to the post C when in use. When not in use, the nut F is partially unscrewed and permits the clamp B, with its threaded portion Q, to be withdrawn sufficiently to release the handle-bar A from the head D of the post C.

The handle-bar A is secured in the clamp B, which may be constructed as shown in Fig. 4, or the portion of the handle-bar that passes through the clamp B may be octagonal or any other suitable shape, and the interior face of the clamp B may be made to correspond therewith in order to securely hold the handle-bar. It may be held firmly in the positions shown by tightening the nut F and can be left on the street with less danger of being stolen, as it would take a little time to unscrew the nut, adjust the handles, and tighten the nut again in order to ride the wheel, and a dishonest person would hardly care to take the chances of rearranging the handle-bar. The chances would be better for the culprit if he could at once mount the wheel and ride away. Of course the principal object that I wish to accomplish is the saving of room and the avoiding of the inconvenience experienced in storing away bicycles in houses or cars. The ends of the clamp B may be threaded a sufficient distance to permit the nut to hold the handle-bar in the positions shown.

With this description of my invention, what I claim is—

In a bicycle, the combination with the handle-bar A, of the clamp B having the bifurcated screw-threaded bolt portion Q, the post C, the head D secured on the post C and at right angles thereto adapted to receive the screw-threaded portion of the clamp and to partially surround the portion of the clamp that encircles the handle-bar, the convex curved portion of the head D to help hold the clamp B in its required adjusted position, and the securing-nut F, substantially as shown and described and for the purposes specified.

GEORGE JAMES BUNGAY.

Witnesses:
JOHN F. KERR,
WM. M. DREW.